United States Patent [19]
Scaramucci

[11] Patent Number: 5,161,566
[45] Date of Patent: Nov. 10, 1992

[54] TOP-ENTRY CHECK VALVE WITH SCREW-IN SEAT

[76] Inventor: John P. Scaramucci, 10724 Woodridden, Oklahoma City, Okla. 73170

[21] Appl. No.: 762,514
[22] Filed: Sep. 18, 1991
[51] Int. Cl.⁵ .......................................... F16K 15/03
[52] U.S. Cl. ................................ 137/328; 137/454.5; 137/527.4; 137/527.8
[58] Field of Search ............ 137/315, 327, 328, 454.2, 137/454.4, 454.5, 454.6, 527, 527.2, 527.4, 527.6, 527.8

[56] References Cited

U.S. PATENT DOCUMENTS

| | | |
|---|---|---|
| 485,745 | 11/1892 | Loveland . |
| 556,636 | 3/1896 | Kuichling . |
| 846,317 | 3/1907 | Kiddle ................ 137/527.4 |
| 1,399,684 | 12/1921 | Belcher ................ 137/527 |
| 1,647,036 | 10/1927 | Dileo . |
| 1,772,086 | 8/1930 | Porter ................ 137/454.2 |
| 1,827,913 | 10/1931 | Rymal . |
| 2,048,088 | 7/1936 | Wagner ................ 251/126 |
| 2,282,532 | 5/1942 | Shenk ................ 137/527.4 |
| 2,844,164 | 7/1958 | Robbins ................ 137/454.6 |
| 2,918,934 | 12/1959 | Wheatley ................ 137/527.2 |
| 2,923,317 | 2/1960 | McInerney ................ 137/527.2 |
| 2,928,416 | 3/1960 | Balhouse ................ 137/527.8 |
| 3,075,547 | 1/1963 | Scaramucci ................ 137/516.2 |
| 3,119,594 | 1/1964 | Geggem ................ 251/228 |
| 3,295,550 | 1/1967 | Scaramucci ................ 137/527.4 |
| 3,394,731 | 7/1968 | Elliott ................ 137/527.8 |
| 3,817,277 | 6/1974 | Wheatley ................ 137/515.7 |
| 3,934,608 | 1/1976 | Guyton ................ 137/527.8 |
| 4,223,697 | 9/1980 | Pendleton ................ 137/527.8 |
| 4,230,150 | 10/1980 | Scaramucci ................ 137/527 |
| 4,252,144 | 2/1981 | Scaramucci ................ 137/454.6 |
| 4,508,139 | 4/1985 | Teumer ................ 137/315 |
| 4,852,603 | 8/1989 | Scaramucci ................ 137/527.8 X |

FOREIGN PATENT DOCUMENTS 1806409 9/1969 Fed. Rep. of Germany .
44-12462 6/1969 Japan .

Primary Examiner—Robert G. Nilson
Attorney, Agent, or Firm—Dunlap, Codding & Lee

[57] ABSTRACT

A top-entry check valve having a seat, cage, disc and removable bonnet utilizes threaded engagement of the seat and mating counterbore in the valve body to prevent movement of the seat, cage and disc in the downstream direction. An annular shoulder in the valve body prevents movement of the seat, cage and disc in the upstream direction. The disc has a hinge pin which is cradled in hinge pin supports of the cage to hold the disc in place. Removal of the bonnet allows access to the valve chamber for replacement of the seat, cage or disc.

15 Claims, 7 Drawing Sheets

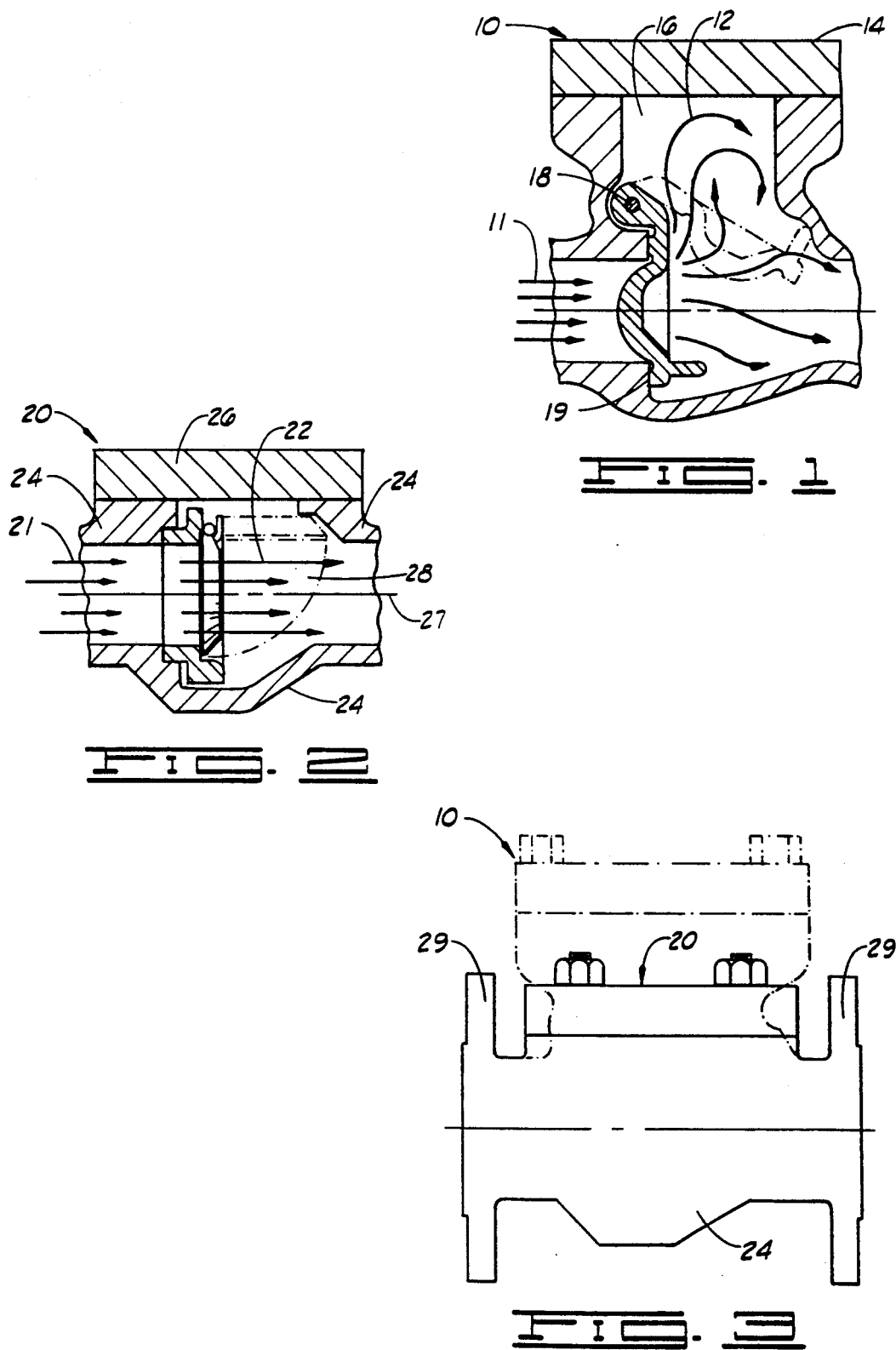

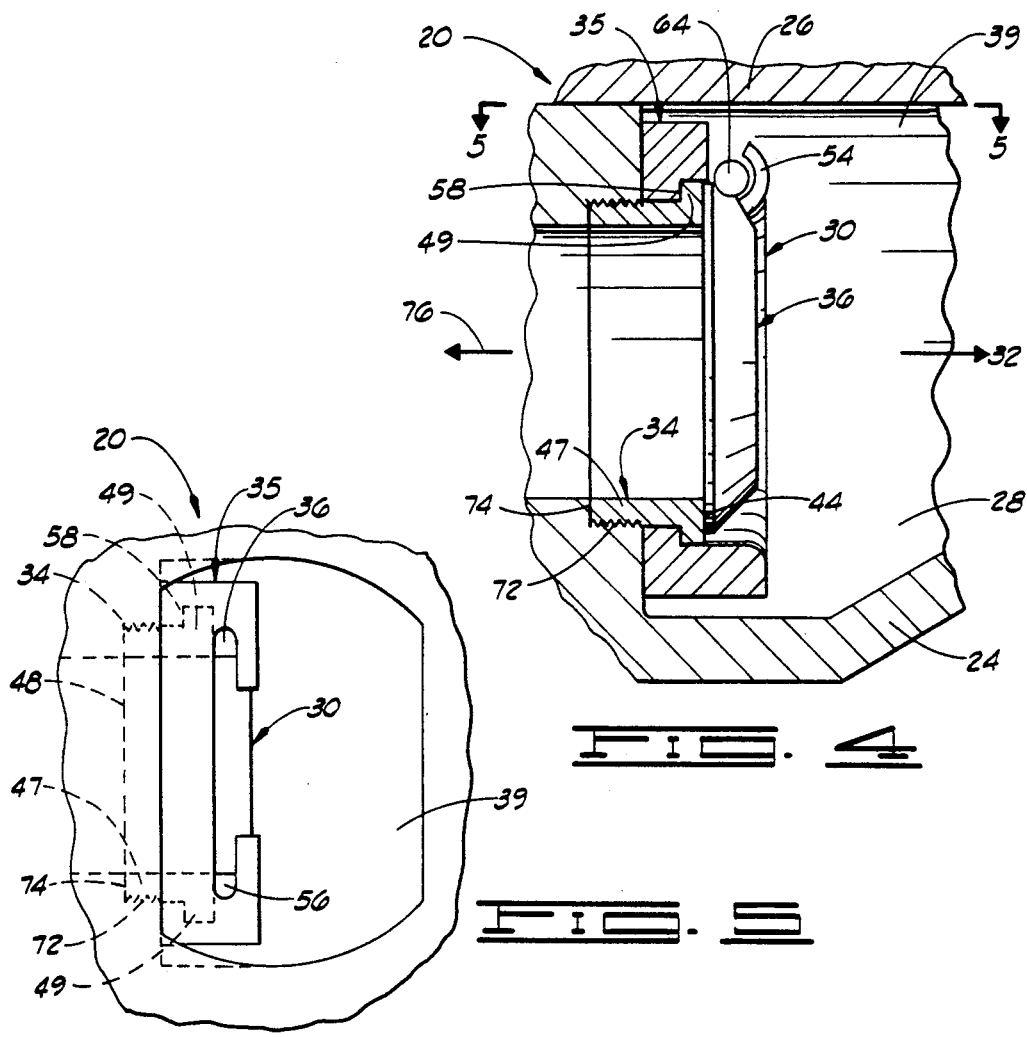
FIG. 4
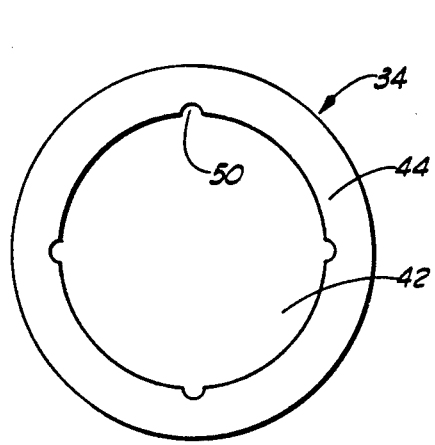
FIG. 5
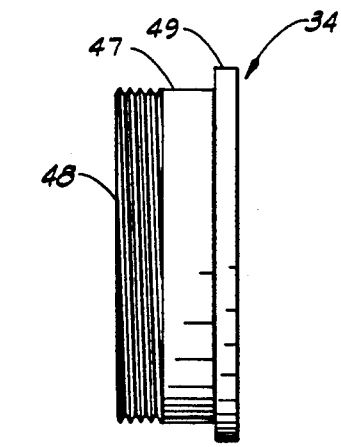
FIG. 6
FIG. 7

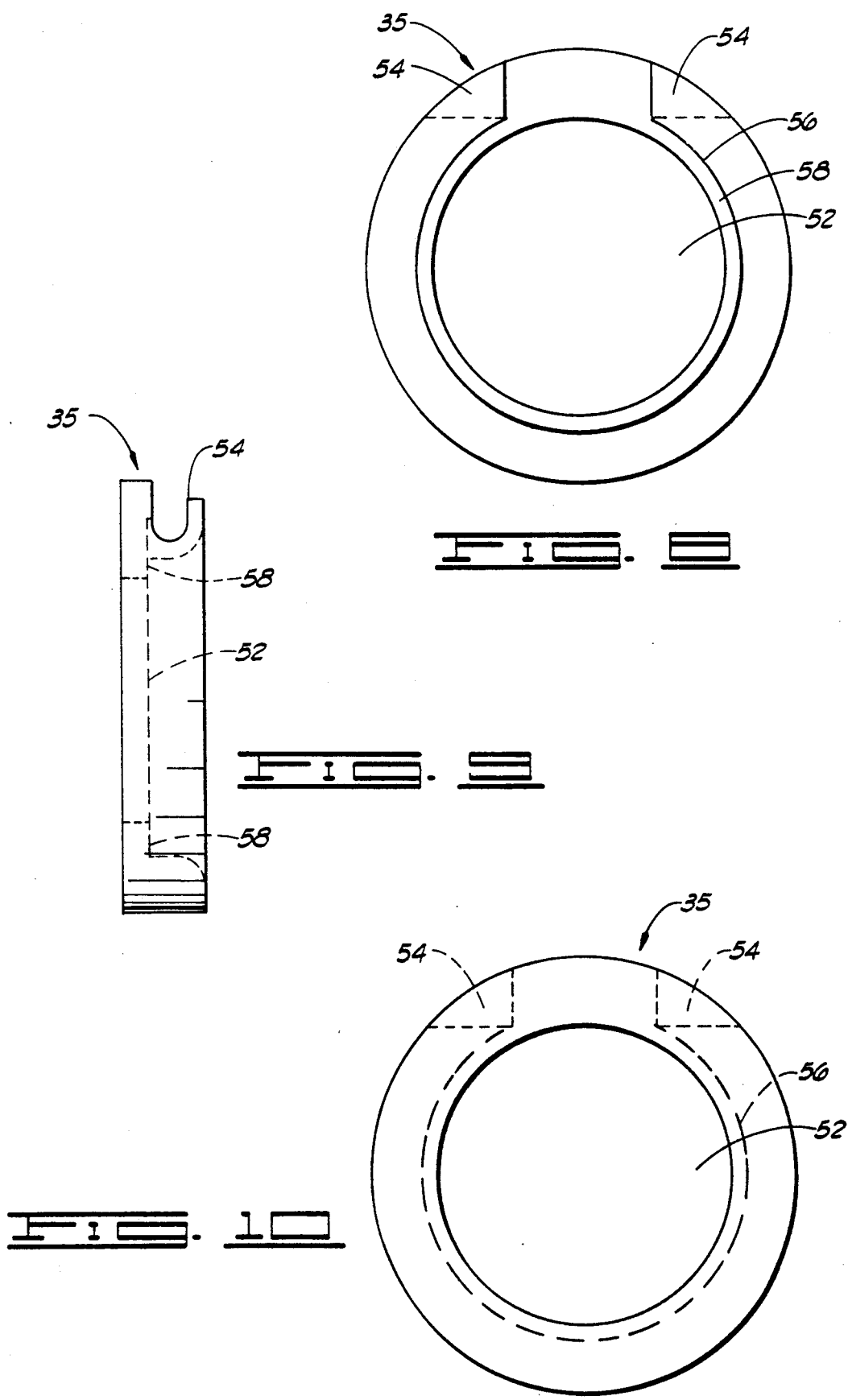

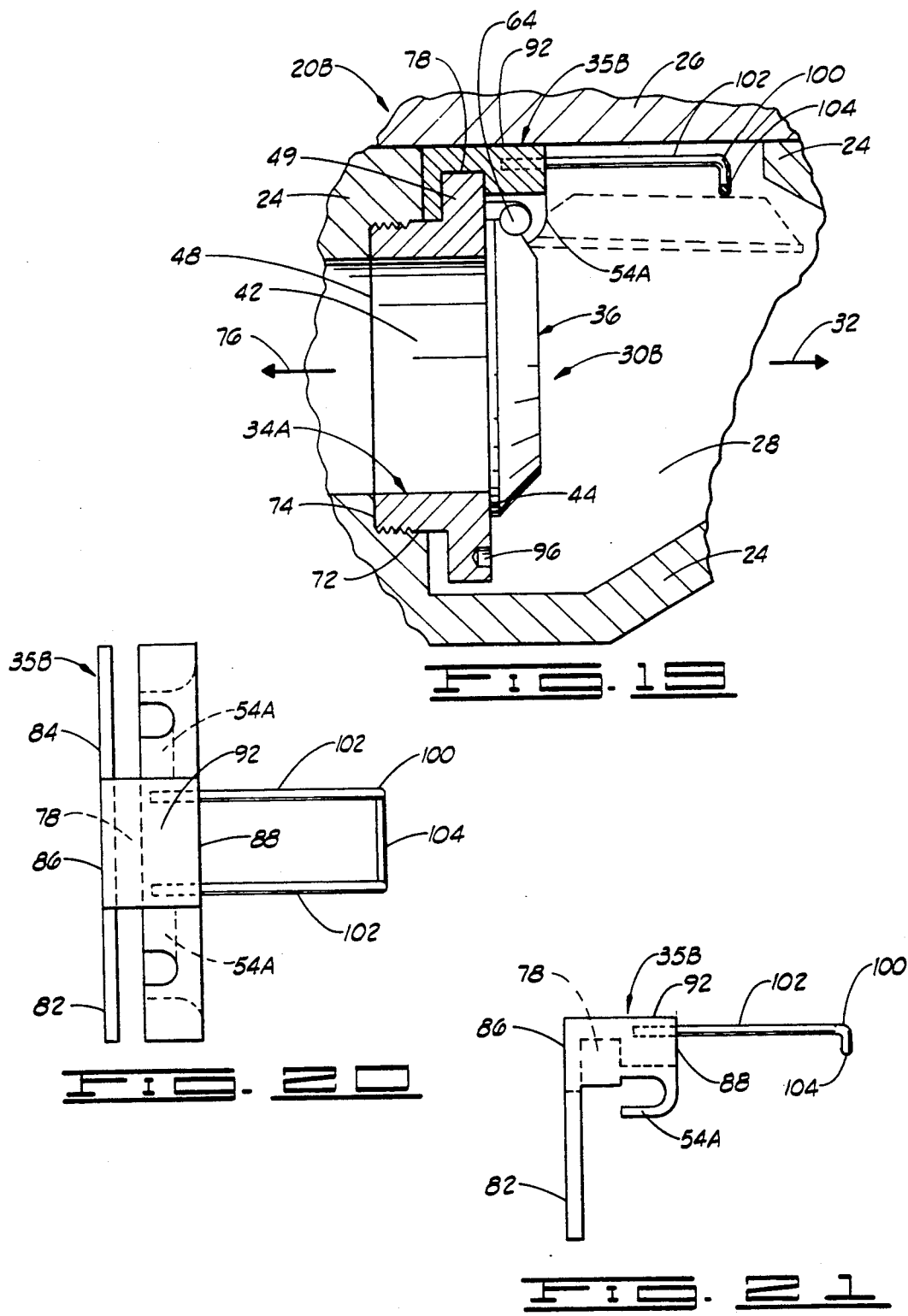

1

TOP-ENTRY CHECK VALVE WITH SCREW-IN SEAT

CROSS-REFERENCE TO RELATED APPLICATIONS

This application is related to the following applications filed on an even date herewith:

Top-Entry Check Valve Having Retainer Ring, Ser. No. 762,104, filed Sep. 18, 1991.

Top-Entry Check Valve With Threaded Fasteners, Ser. No. 762,540, filed Sep. 18, 1991.

Top-Entry Check Valve Having Spring Retainer, Ser. No. 762,517, filed Sep. 18, 1991.

Top-Entry Check Valve With Cartridge Secured By Projections, Ser. No. 761,594, filed Sep. 18, 1991, now U.S. Pat. No. 5,143,113.

Top-Entry Check Valve With Cartridge Secured By Threaded Projections, Ser. No. 762,811, filed Sep. 18, 1991, now U.S. Pat. No. 5,143,112.

Top-Entry Check Valve With Pin Fasteners, Ser. No. 762,539, filed Sep. 18, 1991.

FIELD OF THE INVENTION

This invention relates to improvements in top-entry swing check valves.

SUMMARY OF THE INVENTION

The present invention provides a top-entry check valve with a smooth, straight chamber which minimizes both turbulence and pressure drop of the fluid passing through the valve. The relatively small cavity of this design allows an overall reduction in size and weight over conventional top-entry check valves.

The cartridge assembly of the valve includes a seat, a cage and a disc. A removable bonnet is attached over the access opening to the valve chamber. With the bonnet detached, the seat, cage and disc can readily be replaced.

An annular shoulder in the valve chamber prevents the valve cartridge from moving in an upstream direction. The seat screws into a threaded counterbore in the valve body to prevent downstream movement of the valve cartridge.

Additional advantages and features will become apparent from the detailed description of the preferred embodiments of the invention when read in conjunction with the drawings and appended claims.

BRIEF DESCRIPTION OF THE DRAWINGS

FIG. 1 is a vertical cross-sectional view of a prior art top-entry check valve with turbulent flow.

FIG. 2 is a vertical cross-sectional view of a top-entry check valve constructed in accordance with the present invention and illustrating the smooth flow through the valve chamber.

FIG. 3 is a side elevation of a top-entry check valve constructed in accordance with the present invention with a prior art top-entry check valve shown in outline to illustrate the improved dimensions of the present invention.

FIG. 4 is a vertical cross-sectional view of a portion of a top-entry check valve constructed in accordance with the present invention.

FIG. 5 is a cross-sectional view taken along lines 5—5 of FIG. 4.

FIG. 6 is an elevational view of the seat of the valve of FIG. 4 from the downstream side.

FIG. 7 is a side elevation of the seat of FIG. 6.

FIG. 8 is an elevational view of the cage of the valve of FIG. 4 from the downstream side.

FIG. 9 is a side elevation of the cage of FIG. 8.

FIG. 10 is an elevational view of the cage of FIG. 8 from the upstream side.

FIG. 19 is a vertical cross-sectional view of a portion of another form of top-entry check valve constructed in accordance with the present invention.

FIG. 20 is a top plan view of the cage of the valve of FIG. 19.

FIG. 21 is a side elevation of the cage of the valve of FIG. 19.

DETAILED DESCRIPTION OF THE PREFERRED EMBODIMENTS

Figure 11:
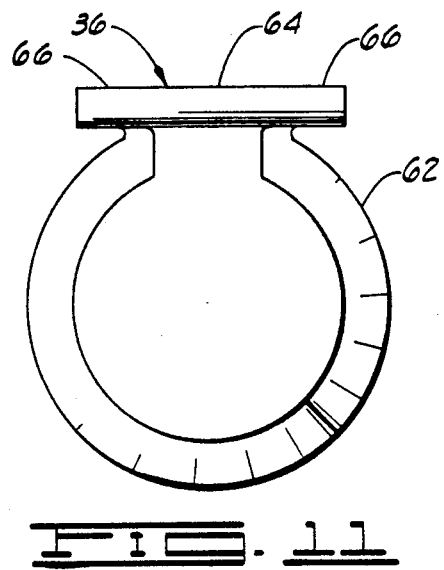
FIG. 11 is an elevational view of the disc of the valve of FIG. 4 from the downstream side.

Referring now to the drawings in detail, and to FIG. 1 in particular, the reference numeral 10 generally designates a prior art top-entry check valve. Flow into the valve 10 is indicated by the straight arrows 11. As illustrated by the swirling arrows 12, turbulent flow is created by the high bonnet 14 and large cavity 16. This construction requires machining inside the valve body for the hinge 18 and valve seat 19.

FIG. 2 illustrates a typical top-entry check valve 20 constructed in accordance with the present invention. Flow into the valve 20 is designated by the straight arrows 21. The arrows 22 illustrate the smooth, even flow through valve 20. The improved flow is a result of the relatively straight lines of the valve body 24. The bonnet 26 forms the top wall of the valve chamber 28, such that there is virtually no cavity between the bonnet and the valve chamber, as contrasted with the existence of a cavity 16 in the prior art valve 10. The distance from the center-line 27 of the body 24 to the bottom of the bonnet 26 is approximately the same as the distance from the center-line to the bottom of the valve chamber.

FIG. 3 is a comparison of a conventional, prior art top-entry check valve 10 (partially in outline) and a check valve 20 constructed in accordance with the present invention (shown in full lines). This comparison illustrates the reduction in size and weight accomplished by the present invention. The drawing also shows the use of flanges 29 at the upstream and downstream ends of the valve 20, although it will be understood that the valve body 24 can be fitted with any desired connecting arrangement.

It will also be understood that the following embodiments include the use of standard seals, such as elastomeric O-ring seals, to provide fluid-tight engagement between various surfaces. Such seals are installed in a conventional manner where needed to prevent leakage of fluid between the valve components. These seals are omitted from the drawings in order to illustrate more clearly the preferred embodiments of the present invention.

EMBODIMENT OF FIGS. 4 AND 5

In FIGS. 4 and 5, the central portion of a valve 20 constructed in accordance with the present invention is shown enlarged. The valve chamber 28 receives a valve cartridge assembly, generally designated by reference character 30. The valve cartridge assembly 30 basically comprises a seat 34, a cage 35 and a disc 36. The valve cartridge assembly 30 controls the flow of fluid through the valve 20. As best shown in FIG. 5, an access opening 39 allows installation and removal of the valve cartridge assembly 30, when the bonnet 26 is detached from the valve body 24.

The seat 34 of the valve 20 is shown separately in FIGS. 6 and 7. The seat 34 is generally circular with a flow opening 42 therethrough. An annular seating face 44 around the flow opening 42 is sized and shaped to mate with the disc 36. As best shown in FIG. 7, a reduced diameter extension 47 is formed on the upstream end 48 of the seat 34 and an annular shoulder 49 extends around the seat 34. The upstream end 48 of the reduced diameter extension 47 of the seat 34 is threaded. As shown in FIG. 6, the seating face 44 of the seat 34 is formed with a plurality of slots. One of the slots is designated by reference numeral 50 and is generally representative of the plurality of slots formed in the seating face 44 of the seat 34.

The cage 35 of the valve 20 is shown separately in FIGS. 8, 9 and 10. The cage 35 is generally circular with a flow opening 52 therethrough. A pair of hinge pin supports 54 extend generally radially in the cage 35 to suspend the disc 36 in the valve cartridge assembly 30. A counterbore 56 is formed in the cage 35 around the flow opening 52. As best shown in FIG. 9, the counterbore 56 forms a downstream-facing annular shoulder 58 in the cage 35. FIG. 9 also illustrates that the hinge pin supports 54 are U-shaped in cross-section.

Figure 12:
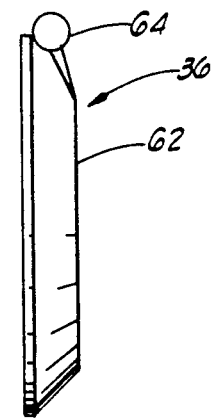
FIG. 12 is a side elevation of the disc of FIG. 11
Figure 13:
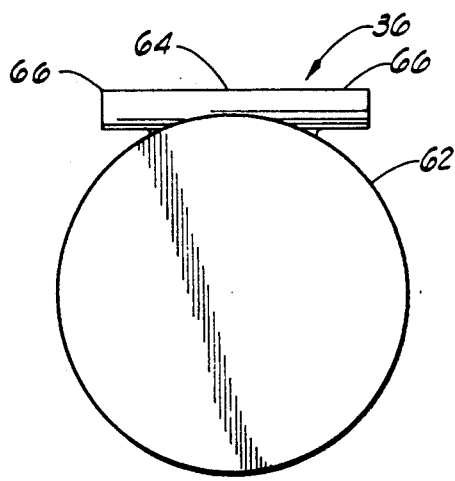
FIG. 13 is an elevational view of the disc of FIG. 11 from the upstream side.

The disc 36 of the valve 20 is shown separately in FIGS. 11, 12 and 13. The disc 36 is a generally circular flat plate 62. At least one hinge pin 64, with end portions 66, extends at a tangent from the plate 62. As discussed hereinafter, the end portions 66 of the hinge pin 64 pivotally support the disc 3 within the valve 20.

The arrangement of the valve cartridge assembly 30 in the valve chamber 28 is disclosed in FIGS. 4 and 5. As described hereinabove, the valve cartridge assembly 30 comprises the seat 34, the cage 35 and the disc 36. The reduced diameter extension 47 of the seat 34 fits into a mating counterbore 72 in the valve chamber 28. The mating counterbore 72 is threaded to receive the threaded reduced diameter extension 47 of the seat 34. The mating counterbore 72 forms an annular shoulder 74 facing downstream to mate with the upstream end 48 of the seat 34. The threaded engagement of the seat 34 with the mating counterbore 72 and the engagement of the annular shoulder 74 with the upstream end 48 of the seat 34 cooperate to prevent movement of the seat 34 in the upstream direction indicated by arrow 76. As shown in FIGS. 4 and 5, the cage 35 engages the valve body 24 also to prevent movement of the cage 35 and disc 36 in the upstream direction 76.

The threaded engagement of the seat 34 with the mating counterbore 72 prevents movement of the seat 34 in the downstream direction 32. The annular shoulder 49 of the seat 34 engages the annular shoulder 58 of the cage 35 to prevent the cage 35 and the disc 36 from moving in the downstream direction 32.

As best illustrated by FIG. 4, the hinge pin supports 54 of the cage 35 cradle the end portions 66 of the hinge pin 64 of the disc 36 to suspend the disc 36 within the valve cartridge assembly 30. The disc 36 pivots about the axis of the hinge pin 64 to close against the seating face 44 of the seat 34 and prevent flow through the valve cartridge assembly 30 in the upstream direction 76. Conversely, the disc 36 pivots about the axis of the hinge pin 64 to open away from the seating face 44 of the seat 34 and allow unobstructed flow through the valve cartridge assembly 30 in the downstream direction 32.

The hinge pin supports 54 are larger than the diameter of the hinge pin 64 and allow the disc 36 to float in the upstream 76 and downstream 32 directions in a near-closed position. This "float" of the disc 36 minimizes damage and wear on the hinge pin 64, hinge pin supports 54 and disc 36. As best shown in FIG. 4, the hinge pin supports 54 are bent over the end portions 66 of the hinge pin 64 to trap the hinge pin 64 in the hinge pin supports 54 and prevent the disc 36 from being dislodged from the valve cartridge assembly 30.

As best shown in FIG. 5, the valve cartridge assembly 30 is readily accessible with the bonnet 26 detached. To remove the valve cartridge assembly 30, the slots 50 are used to grip and unscrew the seat 34 from the counterbore 72. The seat 34, cage 35 and disc 36 are then removed from the valve chamber 28 through the access opening 39. Installing the valve cartridge assembly 30 is accomplished by screwing the seat 34 into the counterbore 72 to secure the cage 35 and disc 36 in the valve chamber 28 as described hereinabove. This arrangement allows easy replacement of the seat 34, cage 35 or valve disc 36 individually, or of the valve cartridge assembly 30 as a unit.

EMBODIMENT OF FIGS. 14 THROUGH 18

Figure 14:
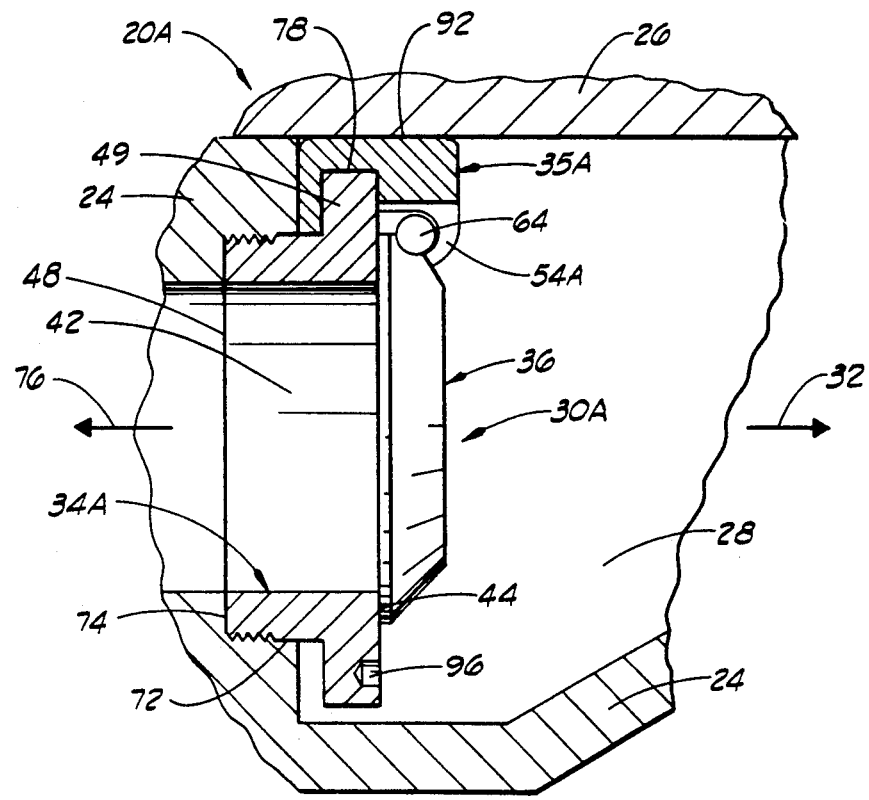
FIG. 14 is a vertical cross-sectional view of a portion of another form of top-entry check valve constructed in accordance with the present invention.

Referring now to FIG. 14, reference character 20A designates another form of a valve constructed in accordance with the present invention. This particular embodiment utilizes a valve cartridge assembly 30A comprising a modified seat 34A and cage 35A with the valve disc 36.

As shown in FIG. 14, the annular shoulder 49 of the seat 34A mates with an arcuate recess 78 in the cage 35A to secure the cage 35A and disc 36 in the valve chamber 28. The hinge pin supports 54A of the cage 35A face upstream and the hinge pin 64 is trapped in the hinge pin supports 54A by the seat 34A.

Figures 15, 16:
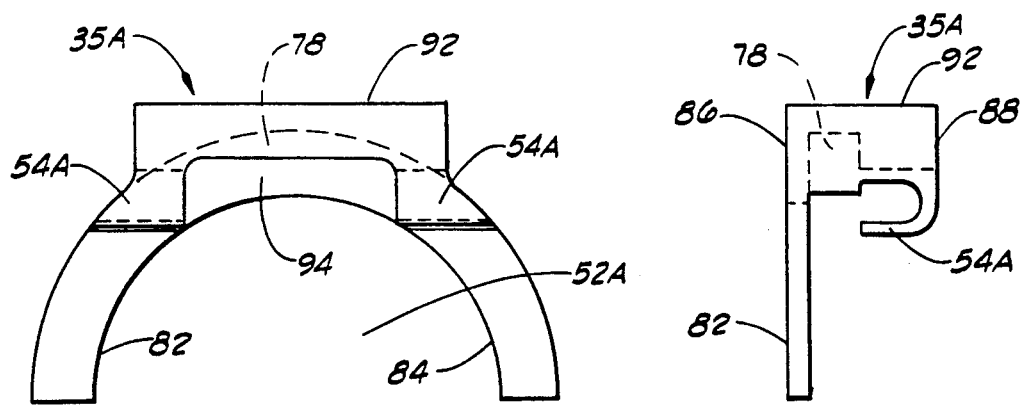
FIG. 15 is an elevational view of the cage of the valve of FIG. 14 from the downstream side.
FIG. 16 is a side elevation of the cage of FIG. 15.

The cage 35A is shown separately in FIGS. 15 and 16. As best shown in FIG. 15, the cage 35A is a generally semi-circular shape formed by a pair of legs 82 and 84 extending around the flow opening 52A on the upstream end 86 of the cage 35A. The hinge pin supports 54A are formed on the downstream end 88 of the cage 35A and face upstream. The cage 35A has a flat-topped crown 92. As best shown in FIG. 15, the cage 35A has a cut-out 94 formed in the downstream end 88 of the cage 35A between the hinge pin supports 54A.

Figure 17:
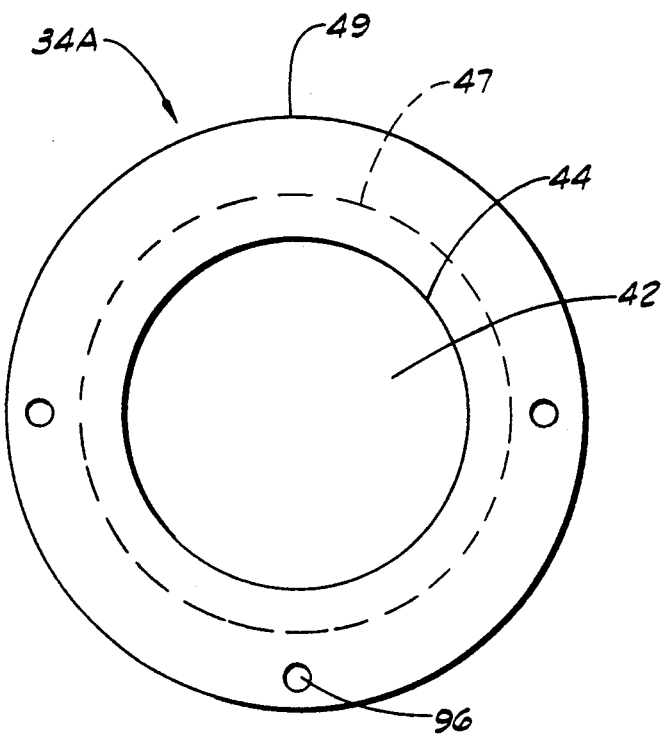
FIG. 17 is an elevational view of the seat of the valve of FIG. 14 from the downstream side.
Figure 18:
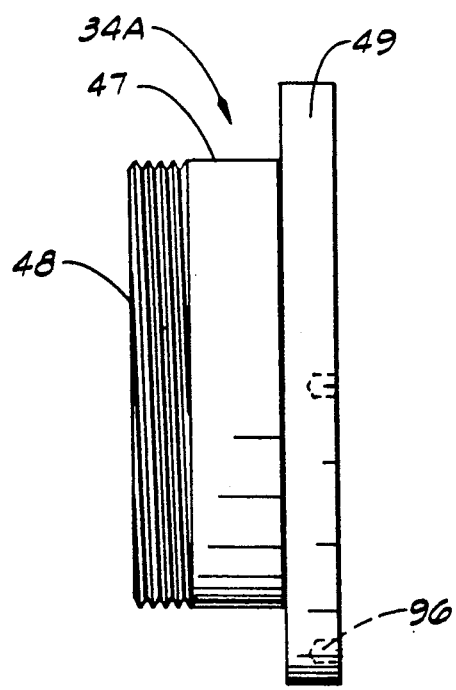
FIG. 18 is a side elevation of the seat of FIG. 17.

The seat 34A is shown separately in FIGS. 17 and 18. A plurality of holes are formed in the surface of the seat 34A facing downstream. One of the holes is designated by the reference numeral 96 and is generally representative of the plurality of holes formed in the seat 34A. The holes 96 are located in the annular shoulder 49 portion of the seat 34A outside the seating face 44.

Referring back to FIG. 14, it will be seen that the annular shoulder 49 of the seat 34A mates with the arcuate recess 78 of the cage 35A. When the seat 34A is screwed into the mating counterbore 72, the annular shoulder 49 of the seat 34A may clamp the arcuate legs 82 and 84 and the upstream end 86 of the cage 35A against the valve body 24. On the other hand, the seat 34A may be screwed in place first, then the cage 35A put in place. This arrangement secures the seat 34A, the cage 35A and the disc 36 against movement in the downstream direction.

When the valve cartridge assembly 30 is installed in the valve chamber 28 and the bonnet 26 is attached, the flat-topped crown 92 of the cage 35A engages the bonnet 26 to prevent transverse rotation of the cage 35A. The seat 34A and the annular shoulder 49 of the seat 34A trap the hinge pin 64 in the hinge pin supports 54A to prevent the disc 36 from becoming dislodged from the hinge pin supports 54A. The cut-out 94 of the cage 35A keeps the cage 35A from interfering with the disc 36 as the disc 36 pivots away from the seating face 44 to allow unobstructed flow through the valve cartridge assembly 30A.

With the bonnet 26 detached, the holes 96 in the seat 34A are used for gripping and wrenching the seat 34A to unscrew the seat 34A from the mating counterbore 72. The seat 34A, the cage 35A and the disc 36 can then be easily replaced.

EMBODIMENT OF FIGS. 19, 20 AND 21

Referring now to FIG. 19, reference character 20B designates another form of a valve constructed in accordance with the present invention. This particular embodiment utilizes the cage 35B, which is a modification of the cage 35A.

As shown in FIG. 19, the cage 35B includes a cushion member 100 extending from the downstream end of the cage 35B. When the disc 36 opens rapidly, as indicated by the phantom lines, the disc 36 strikes the cushion member 100 before the disc 36 reaches the bonnet 26 or the valve body 24. The cushion member 100 absorbs the impact of the disc 36 when the disc 36 opens rapidly to a fully open position to allow fluid flow in the downstream direction 32. By preventing forceful impact of the disc 36 with the bonnet 26 or valve body 24, the cushion member 100 reduces wear and prolongs the useful life of the disc 36, bonnet 26 and valve body 24.

FIGS. 20 and 21 illustrate the cage 35B separately. As shown by these figures, the cage 35B is exactly like the cage 35A except that the cage 35B further comprises the cushion member 100. As best shown in FIG. 20, the cushion member 100 is a generally U-shaped spring and includes a pair of substantially parallel legs 102 joined by a transverse leg 104. As FIG. 21 illustrates, at least a portion of each parallel leg 102 is bent down so that the opening disc 36 makes contact with the transverse leg 104 before striking any other surface.

Changes may be made in the combinations, operations and arrangements of the various parts and elements described herein without departing from the spirit and scope of the invention as defined in the following claims.

What is claimed is:

1. A top entry check valve, comprising:
   a valve cartridge assembly, including a seat, cage and disc, the seat having an annular shoulder facing upstream and the cage having a recess mating with the annular shoulder of the seat;
   a body having upstream and downstream ends, a valve chamber therein communicating with the upstream and downstream ends thereof, and an access opening in a side wall thereof communicating with the valve chamber of a size to accommodate the entry and removal of the valve cartridge assembly therethrough, the body also having an annular shoulder therein facing downstream sized to engage the valve cartridge and to prevent the valve cartridge from moving upstream; and
   a bonnet removably attached to the body over said access opening;
   wherein the seat is threadedly secured in the body to prevent downstream movement of the seat and the annular shoulder of the seat engages the recess of the cage to prevent downstream movement of the cage.

2. A valve as defined in claim 1 wherein the disc is a generally circular flat plate having at least one hinge pin thereon extending along a tangent to the flat plate, the seat has a seating face thereon facing downstream and sized to mate with the disc, and the cage has a pair of hinge pin supports thereon receiving the opposite end portions of the hinge pin.

3. A valve as defined in claim 2 wherein each hinge pin support faces radially with respect to the disc.

4. A valve as defined in claim 2 wherein each hinge pin support is generally U-shaped in cross section.

5. A valve as defined in claim 2 wherein each hinge pin support is sized larger than the diameter of the hinge pin, whereby the disc can float in upstream and downstream directions in a near-closed position.

6. A valve as defined in claim 2 wherein said hinge pin supports are generally U-shaped in cross-section and face radially with respect to the disc, and wherein one side of each hinge pin support is bent over a portion of the hinge pin to trap the hinge pin therein.

7. A valve as defined in claim 1 wherein the cage has a substantially flat top surface and the bonnet has a bottom surface engaging the top of the cage to maintain alignment of the cage when the valve cartridge is installed in the valve chamber and the bonnet is attached over the access opening.

8. A valve as defined in claim 1 wherein each hinge pin support faces upstream and the seat is positioned to trap the hinge pin in the hinge pin supports.

9. A valve as defined in claim 1 wherein the cage further comprises a cushion member extending from the cage opposite the mating recess of the cage to engage the disc when the disc is fully open.

10. A valve as defined in claim 9 wherein the cushion member is a substantially U-shaped spring.

11. A valve as defined in claim 9 wherein at least a portion of the cushion member is bent over into the valve chamber.

12. A valve as defined in claim 1 wherein the seat has a plurality of recesses accessible from the access opening for applying leverage to the seat to turn the seat and screw the seat into the body and unscrew the seat from the body for the entry and removal of the valve cartridge assembly.

13. A valve as defined in claim 1 wherein the body has a threaded counterbore and the seat has an upstream end threaded to screw into the threaded counterbore of the body.

14. A top entry check valve, comprising:

a valve cartridge assembly, including a seat, cage and disc, the disc being a generally circular flat plate having at least one hinge pin thereon extending along a tangent to the flat plate, the seat having a seating face thereon facing downstream and sized to mate with the disc, and the cage having a pair of hinge pin supports thereon receiving the opposite end portions of the hinge pin;

a body having upstream and downstream ends, a valve chamber therein communicating with the upstream and downstream ends thereof, and an access opening in a side wall thereof communicating with the valve chamber of a size to accommodate the entry and removal of the valve cartridge assembly therethrough, the body also having an annular shoulder therein facing downstream sized to engage the valve cartridge and to prevent the valve cartridge from moving upstream; and a bonnet removably attached to the body over said access opening;

wherein the seat is threadedly secured in the body, said hinge pin supports are generally U-shaped and face radially with respect to the disc, and wherein one side of each hinge pin support is bent over a portion of the hinge pin to trap the hinge pin therein.

15. A top entry check valve, comprising:

a valve cartridge assembly, including a seat, cage and disc, the disc being a generally circular flat plate having at least one hinge pin thereon extending along a tangent to the flat plate, the seat having a seating face thereon facing downstream and sized to mate with the disc, and the cage having a pair of hinge pin supports thereon receiving the opposite end portions of the hinge pin;

a body having upstream and downstream ends, a valve chamber therein communicating with the upstream and downstream ends thereof, and an access opening in a side wall thereof communicating with the valve chamber of a size to accommodate the entry and removal of the valve cartridge assembly therethrough, the body also having an annular shoulder therein facing downstream sized to engage the valve cartridge and to prevent the valve cartridge from moving upstream; and a bonnet removably attached to the body over said access opening;

wherein the seat is threadedly secured in a counterbore in the valve body and has a plurality of recesses accessible from the access opening for applying leverage to the seat to turn the seat and screw the seat into the threaded counterbore of the body and unscrew the seat from the threaded counterbore of the body for the entry and removal of the valve cartridge assembly.

* * * * *